United States Patent
Tian (10) Patent No.: US 11,211,051 B2
(45) Date of Patent: Dec. 28, 2021

(54) METHOD AND APPARATUS FOR PROCESSING AUDIO DATA

(71) Applicant: Baidu Online Network Technology (Beijing) Co., Ltd., Beijing (CN)

(72) Inventor: Chao Tian, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 161 days.

(21) Appl. No.: 16/805,053

(22) Filed: Feb. 28, 2020

(65) Prior Publication Data

US 2021/0005179 A1    Jan. 7, 2021

(30) Foreign Application Priority Data

Jul. 3, 2019   (CN) .......................... 201910593846.3

(51) Int. Cl.
  *G10L 15/06*    (2013.01)
  *G10L 15/22*    (2006.01)
  *G10L 19/26*    (2013.01)

(52) U.S. Cl.
  CPC ............ *G10L 15/063* (2013.01); *G10L 15/22* (2013.01); *G10L 19/26* (2013.01)

(58) Field of Classification Search
  CPC ........ G10L 15/063; G10L 15/22; G10L 19/26
  See application file for complete search history.

(56) References Cited

U.S. PATENT DOCUMENTS

| 4,776,016 | A | * | 10/1988 | Hansen | ...................... G06F 3/16 381/110 |
| 5,058,080 | A | * | 10/1991 | Siems | ...................... G01V 1/22 367/79 |
| 5,377,302 | A | * | 12/1994 | Tsiang | ...................... G10L 15/16 704/231 |
| 6,052,412 | A | * | 4/2000 | Ruether | ................. H04B 14/04 375/231 |
| 6,681,209 | B1 | | 1/2004 | Schmidt | |
| 6,721,698 | B1 | * | 4/2004 | Hariharan | ............... G10L 15/02 704/203 |
| 6,868,162 | B1 | * | 3/2005 | Jubien | ...................... H03G 5/22 381/107 |
| 6,873,368 | B1 | * | 3/2005 | Yu | .................. H04N 21/234363 348/385.1 |

(Continued)

FOREIGN PATENT DOCUMENTS

| CN | 1236222 A | 11/1999 |
| CN | 1306352 A | 8/2001 |

(Continued)

*Primary Examiner* — Michael Colucci
(74) *Attorney, Agent, or Firm* — Nixon Peabody LLP (57) ABSTRACT

A method and an apparatus for processing audio data are provided. The method includes: acquiring a first piece of audio data; and processing the first piece of audio data based on an antialias filter, to generate a second piece of audio data, a sampling rate of the second piece of audio data being smaller than a sampling rate of the first piece of audio data; the antialias filter being generated by: inputting training voice data in a training sample into an initial antialias filter; inputting an output of an initial antialias filter into a training speech recognition model, and generating a training speech recognition result; and adjusting the initial antialias filter based on the training speech recognition result and a target speech recognition result of the training voice data in the training sample.

9 Claims, 5 Drawing Sheets

(56) References Cited

U.S. PATENT DOCUMENTS

| | | | |
|---|---|---|---|
| 9,934,780 B2 | 4/2018 | Tzirkel-Hancock | |
| 2001/0044718 A1* | 11/2001 | Cox | G10L 15/02 704/236 |
| 2003/0004720 A1* | 1/2003 | Garudadri | G10L 15/30 704/247 |
| 2006/0190259 A1* | 8/2006 | Jeong | G10L 15/08 704/256 |
| 2007/0136058 A1* | 6/2007 | Jeong | G10L 15/08 704/240 |
| 2008/0208577 A1* | 8/2008 | Jeong | G10L 15/16 704/231 |
| 2011/0137660 A1* | 6/2011 | Strommer | G10L 19/26 704/500 |
| 2013/0030803 A1 | 1/2013 | Liao | |
| 2013/0207822 A1* | 8/2013 | Snelgrove | H03M 1/0639 341/143 |
| 2014/0039817 A1 | 2/2014 | Dayan | |

FOREIGN PATENT DOCUMENTS

| | | |
|---|---|---|
| CN | 101820372 A | 9/2010 |
| CN | 102903360 A | 1/2013 |
| CN | 103208287 A | 7/2013 |
| CN | 203037739 U | 7/2013 |
| CN | 203037749 U | 7/2013 |
| CN | 103581081 A | 2/2014 |
| CN | 104737029 A | 6/2015 |
| CN | 204594573 U | 8/2016 |
| CN | 206124669 U | 4/2017 |
| CN | 106768284 A | 5/2017 |
| CN | 107359868 A | 11/2017 |
| CN | 206781702 U | 12/2017 |
| CN | 108762331 A | 11/2018 |
| CN | 109147808 A | 1/2019 |

\* cited by examiner

METHOD AND APPARATUS FOR PROCESSING AUDIO DATA

CROSS-REFERENCE TO RELATED APPLICATIONS

This application claims priority to Chinese Patent Application No. 201910593846.3, filed on Jul. 3, 2019, titled "Method and Apparatus for Processing Audio Data," which is hereby incorporated by reference in its entirety.

TECHNICAL FIELD

Embodiments of the present disclosure relate to the field of computer technology, and specifically to a method and apparatus for processing audio data.

BACKGROUND

Artificial intelligence (AI) is a novel technological science that studies and develops theories, methods, technologies and application systems for simulating, extending and expanding human intelligence. Artificial intelligence is a branch of the computer science that attempts to understand the essence of intelligence and produces a novel intelligent machine capable of responding in a way similar to human intelligence. Researches in the field include robots, speech recognition, image recognition, natural language processing, expert systems, and the like. Speech recognition technology is an important direction in the computer science field and the artificial intelligence field.

Audio data for speech recognition by a speech recognition model is generally an audio stream at a specific sampling rate. In order to adapt for the speech recognition model, generally, audio streams at various sampling rates are converted into audio streams at the specific sampling rate before speech recognition.

SUMMARY

Embodiments of the present disclosure present a method and apparatus for processing audio data.

In a first aspect, a method for processing audio data is provided according to embodiments of the disclosure. The method includes: acquiring a first piece of audio data, a sampling rate of the first piece of audio data being a first target sampling rate; and processing the first piece of audio data based on a pre-generated antialias filter, to generate a second piece of audio data, a sampling rate of the second piece of audio data being a second target sampling rate, and the second target sampling rate being smaller than the first target sampling rate; where the antialias filter is generated by: inputting training voice data in a training sample into an initial antialias filter; inputting an output of the initial antialias filter into a training speech recognition model, and generating a training speech recognition result; and adjusting the initial antialias filter based on the training speech recognition result and a target speech recognition result of the training voice data in the training sample, to generate the antialias filter.

In a second aspect, an apparatus for processing audio data is provided according to embodiments of the disclosure. The apparatus includes: a first acquiring unit configured to acquire a first piece of audio data, a sampling rate of the first piece of audio data being a first target sampling rate; and a first generating unit configured to process the first piece of audio data based on a pre-generated antialias filter, to generate a second piece of audio data, a sampling rate of the second piece of audio data being a second target sampling rate, and the second target sampling rate being smaller than the first target sampling rate; where the antialias filter is generated by: inputting training voice data in a training sample into an initial antialias filter; inputting an output of the initial antialias filter into a training speech recognition model, and generating a training speech recognition result; and adjusting the initial antialias filter based on the training speech recognition result and a target speech recognition result of the training voice data in the training sample, to generate the antialias filter.

In a third aspect, an electronic device is provided according to embodiments of the disclosure. The electronic devices include one or more processors; and a storage apparatus, storing one or more programs, where the one or more programs, when executed by the one or more processors, cause the one or more processors to implement any embodiment of the method for processing audio data.

In a fourth aspect, a computer readable medium is provided according to embodiments of the disclosure. The computer readable medium includes a computer program which, when executed by a processor, implement any embodiment of the method for processing audio data.

In the method and apparatus for processing audio data provided by embodiments of the present disclosure, a first piece of audio data is acquired, a sampling rate of the first piece of audio data being a first target sampling rate; and the first piece of audio data is processed based on a pre-generated antialias filter, to generate a second piece of audio data, a sampling rate of the second piece of audio data being a second target sampling rate, and the second target sampling rate being smaller than the first target sampling rate; where the antialias filter is generated by: inputting training voice data in a training sample into an initial antialias filter; inputting an output of an initial antialias filter into a training speech recognition model, and generating a training speech recognition result; and adjusting the initial antialias filter based on the training speech recognition result and a target speech recognition result of the training voice data in the training sample, to generate the antialias filter. The technical effects may include: providing a novel approach of processing audio data, and specifically providing a novel approach of converting a sampling rate of the audio data.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described in detail below in combination with the accompanying drawings and the embodiments. It may be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described in detail below with reference to the accompanying drawings and in combination with the embodiments.

Figure 1:
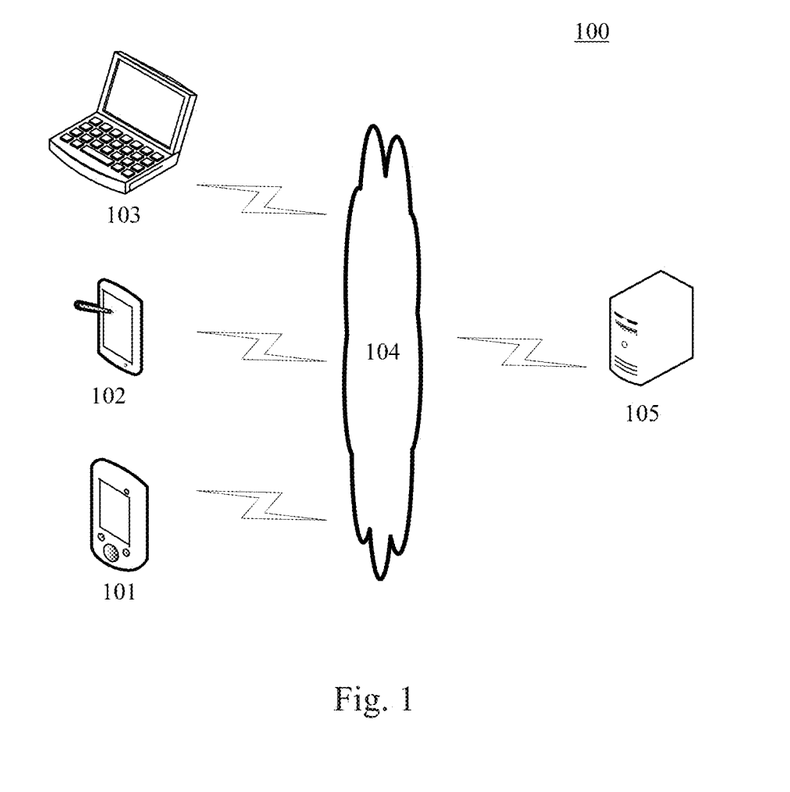
FIG. 1 is a diagram of an example system architecture in which an embodiment of the present disclosure may be implemented.

FIG. 1 shows an example system architecture 100 in which a method for processing audio data or an apparatus for processing audio data of the present disclosure may be implemented.

As shown in FIG. 1, the system architecture 100 may include terminal devices 101, 102, and 103, a network 104, and a server 105. The network 104 may serve as a medium providing a communication link between the terminal devices 101, 102, and 103, and the server 105. The network 104 may include various types of connections, such as wired or wireless communication links, or optical cables.

The terminal devices 101, 102, and 103 may interact with the server 105 via the network 104, for example, to receive or send a message. The terminal devices 101, 102, and 103 may be provided with various communication client applications, such as a speech recognition application, a shopping application, and an instant messaging tool.

When the terminal devices 101, 102 and 103 are hardware, the terminal devices may be an electronic device having a voice collecting device, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, and the like.

The server 105 may be a server providing various services, such as a back-end server providing support for a voice collecting application on the terminal devices 101, 102, and 103. The back-end server can process received audio data to generate audio data at a second target sampling rate, then input the audio data at the second target sampling rate into a speech recognition model to generate a speech recognition result, and optionally, then return a generated speech recognition result to the terminal devices.

It should be noted that the method for processing audio data provided by some embodiments of the present disclosure is generally executed by the server 105. Accordingly, the apparatus for processing audio data is generally provided in the server 105.

It should be noted that the server may be hardware or software. When the server is hardware, the server may be implemented as a distributed server cluster composed of a plurality of servers, or may be implemented as a single server. When the server is software, the sever may be implemented as a plurality of software programs or software modules (e.g., software or software modules for providing distributed services), or may be implemented as a single software program or software module, which is not specifically limited here.

It should be understood that the numbers of terminal devices, networks, and servers in FIG. 1 are merely illustrative. Any number of terminal devices, networks, and servers may be provided based on actual requirements. When an electronic device on which the method for processing audio data is run does not need data transmission with other electronic devices, the system architecture may only include the electronic device on which the method for processing audio data is run.

Figure 2:
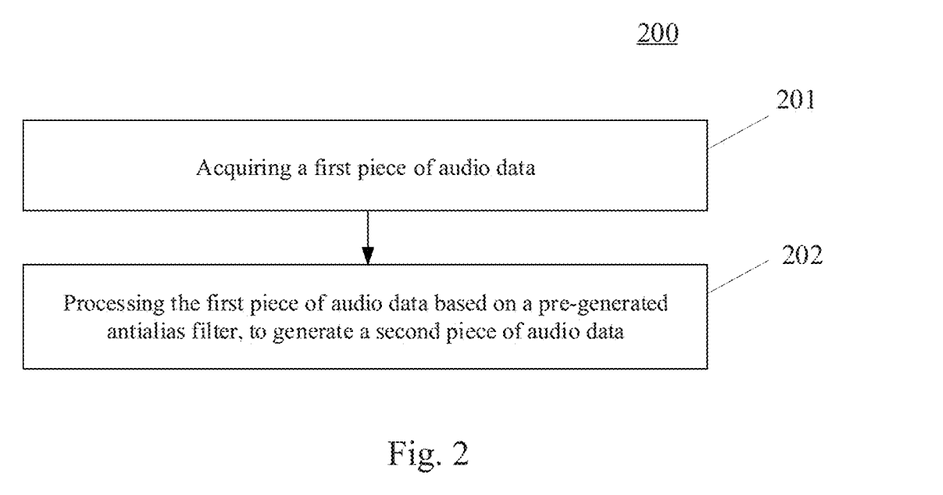
FIG. 2 is a flowchart of a method for processing audio data according, to an embodiment of the present disclosure.

Further referring to FIG. 2, a process 200 of a method for processing audio data according to an embodiment of the present disclosure is shown. The method for processing audio data includes the following steps 201 and 202.

Step 201 includes: acquiring a first piece of audio data.

In the present embodiment, an executing body (e.g., the server shown in FIG. 1) of the method for processing audio data may acquire the first piece of audio data.

Optionally, the executing body may acquire the first piece of audio data from electronic devices other than the above executing body or from the above executing body locally.

Here, a sampling rate of the first piece of audio data is a preset first target sampling rate. As an example, the first target sampling rate may be 192 KHz or 384 KHz.

Here, the audio data may be digitized sound data. The sampling rate, also known as sampling frequency, of the audio data is the number of times of sampling per unit time. With a higher sampling frequency, the interval between sampling points is smaller, and the digitized sound is more realistic, but the corresponding data size is larger. The measurement unit of the sampling rate may be Hertz (Hz) or Kilohertz (KHz).

Step 202 includes: processing the first piece of audio data based on a pre-generated antialias filter, to generate a second piece of audio data.

In the present embodiment, the executing body can process the first piece of audio data based on the pre-generated antialias filter, to generate the second piece of audio data.

Here, a sampling rate of the second piece of audio data is a preset second target sampling rate. As an example, the second target sampling rate may be 16 KHz or 48 KHz.

Here, since the second target sampling rate is smaller than the first target sampling rate, the first piece of audio data needs to be down-sampled. Directly reducing the sampling rate often results in aliasing of the audio data in a frequency domain. Therefore, generally, antialiasing using a low-pass filter is required before down-sampling the audio data. This filter generally may also be referred to as an antialias filter.

Here, the antialias filter can achieve low-pass filtering. Optionally, the antialias filter can also achieve down-sampling.

Optionally, the first piece of audio data may be inputted into the antialias filter, to generate the second piece of audio data at the second target sampling rate.

Optionally, a sampler may be connected to and arranged after the antialias filter. The executing body can input the first piece of audio data into the antialias filter, and then input an output of the antialias filter into the sampler, such that the sampler outputs the second piece of audio data.

Optionally, the second target sampling rate may be a sampling rate of audio data inputted into a speech recognition model. In other words, the sampling rate of the audio data inputted into the speech recognition model may be the second target sampling rate. As an example, the target sampling rate may be 16 KHz, and the sampling rate of the audio data inputted into the speech recognition model is also 16 KHz.

Figure 3:
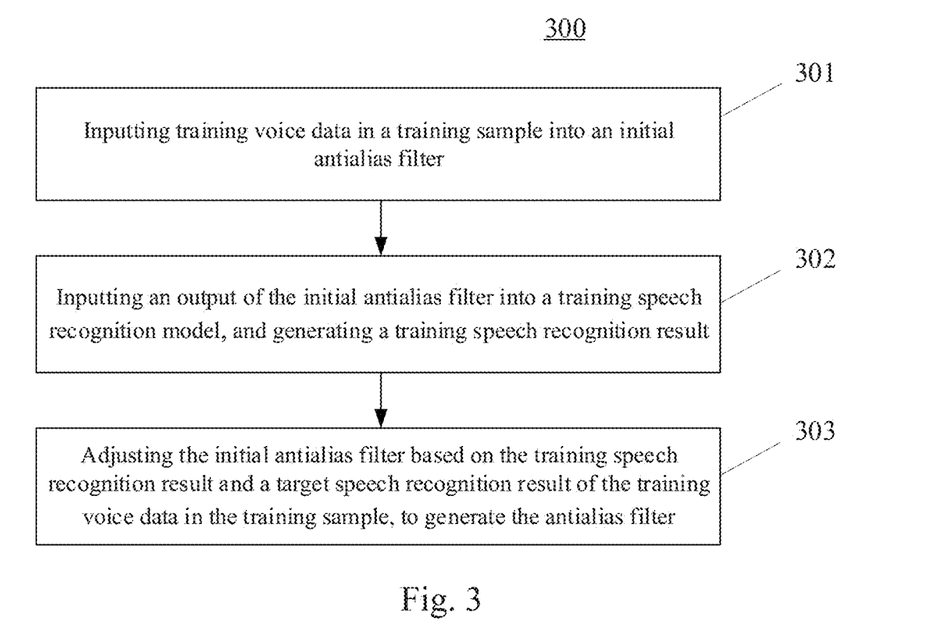
FIG. 3 is an example flowchart of an approach of generating an antialias filter according to an embodiment of the present disclosure.

Here, the antialias filter may be generated by training through a process 300 shown in FIG. 3. An executing body of the process 300 may be the executing body of the process 200, or may be an executing body other than the executing body of the process 200. The process 300 may include steps 301 to 303.

Step 301 includes: inputting training voice data in a training sample into an initial antialias filter.

Here, the training sample may include the training voice data and a target speech recognition result for the training voice data. Here, a sampling rate of the training voice data is the first target sampling rate.

Here, the initial antialias filter may be an untrained filter or a filter that is not completely trained. This filter may be of various types. The initial antialias filter can achieve low-pass filtering. Parameters of the initial antialias filter may be actually set based on different types of the filter. As an example, the initial antialias filter may be a finite impulse response (FIR) filter, and a tap coefficient of the FIR filter used as the antialias filter is an initial value.

Step 302 includes: inputting an output of the initial antialias filter into a training speech recognition model, and generating a training speech recognition result.

Optionally, the output of the initial antialias filter may be inputted into the training speech recognition model, to generate the training speech recognition result.

Optionally, the output may be down-sampled and the down-sampled output is inputted into the training speech recognition model, to generate the training speech recognition result.

Optionally, the training speech recognition model may be a trained speech recognition model, or may be a speech recognition model that is not completely trained.

Step 303: adjusting the initial antialias filter based on the training speech recognition result and a target speech recognition result of the training voice data in the training sample, to generate the antialias filter.

Optionally, if a recognition accuracy rate of the training speech recognition model is greater than a preset accuracy rate threshold, the initial anti-alias filter may be adjusted, without adjusting the training speech recognition model.

Optionally, if the training speech recognition model is a speech recognition model that is not completely trained, not only the initial antialias filter, but also the training speech recognition model may be adjusted.

Here, the adjusting the initial antialias filter may include adjusting the parameters of the initial antialias filter. To-be-adjusted parameters may be actually set based on different types of the filter. As an example, if the initial antialias filter is a FIR filter, the adjusting the initial antialias filter may include adjusting the tap coefficient. As an example, if the initial antialias filter is implemented based on a convolutional neural network, the adjusting the initial antialias filter may include adjusting weight, bias, etc. of the convolutional neural network.

It should be noted that adjusting the initial antialias filter based on the speech recognition result of the speech recognition model may be adjusting the initial antialias filter based on a deviation between the training speech recognition result and the target speech recognition result, such that the antialias filter is more accurate; and has a wider scope of application (can process audio data with different noise characteristics).

Here, the speech recognition model may be configured for characterizing a corresponding relationship between the audio data and the speech recognition result. The speech recognition model may be a model of various structures, which is not described in detail here.

The method illustrated in the present embodiment acquires a first piece of audio data at a first target sampling rate; and then processes the first piece of audio data based on a pre-generated antialias filter, to generate a second piece of audio data, here a sampling rate of the second piece of audio data being a second target sampling rate, and the second target sampling rate being smaller than the first target sampling rate; where the antialias filter is generated by: inputting training voice data in a training sample into an initial antialias filter; inputting an output of the initial antialias filter into a training speech recognition model, and generating a training speech recognition result; and adjusting the initial antialias filter based on the training speech recognition result and a target speech recognition result of the training voice data in the training sample, to generate the antialias filter. The technical effects may include:

First, a novel approach of processing audio data is provided. Specifically, a novel approach of converting the sampling rate of the audio data is provided.

Second, the antialias filter is generated based on the speech recognition model, which can generate antialias filter adapted for speech recognition under the guidance of the speech recognition result, and the second piece of audio data obtained through processing by the antialias filter adapted for speech recognition retains audio data information required for speech recognition. Therefore, when the second piece of audio data generated by the antialias filter is applied to speech recognition, the incorrect speech recognition result is not caused due to the impact of the second piece of audio data. On the other hand, if the antialias filter that processes the first piece of audio data is not, generated based on the speech recognition model, then information details required for speech recognition may be removed from the obtained second piece of audio data, such that the second piece of audio data affects the accuracy of speech recognition, and is not adapted for speech recognition.

In some embodiments, the training speech recognition model is the trained speech recognition model. The recognition accuracy rate of the training speech recognition model may be greater than the preset accuracy rate threshold (e.g., 96%).

It should be noted that generally, the accuracy rate of the trained speech recognition model is verified. The recognition accuracy rate of the training speech recognition model may be greater than the preset accuracy rate threshold. In the case where the accuracy of the speech recognition model can be guaranteed, it can be determined that, the deviation between the training speech recognition result outputted by the speech recognition model and the target speech recognition result is caused by the impact of the initial antialias filter. Therefore, the initial antialias filter can be adjusted pertinently based on the deviation, and based on the speech recognition result of the speech recognition model, such that the antialias filter is more accurate; and has a wider scope of application (can process audio data with different noise characteristics); and the audio data obtained by processing can guarantee that the accuracy of speech recognition is not reduced because of improper processing in the sampling rate conversion stage.

In some embodiments, the antialias filter may include at least two stages of sub-antialias filters. Here, the sub-antialias filters of the antialias filter may be connected sequentially.

In some embodiments, the above step 202 may include performing low-pass filtering and down-sampling on the first piece of audio data using the sub-antialias filters, to generate the second piece of audio data.

As an example, the antialias filter may include three stages of sub-antialias filters, which are referred to as an antialias filter A, an antialias filter B, and an antialias filter C respectively. An input of the antialias filter A is the first piece of audio data, an output of the antialias filter A is connected to an input of the antialias filter B, an output of the antialias filter B is connected to an input of the antialias filter C, and an output of the antialias filter C is the second piece of audio data. The first piece of audio data may be inputted into the antialias filter A, then the output of the antialias filter A is inputted into the antialias filter B, then the output of the antialias filter B is inputted into the antialias filter C, and finally the second piece of audio data is outputted by the antialias filter C In some embodiments, down-sampling factors corresponding to the sub-antialias filters are preset, and a down-sampling factor of a last-stage sub-antialias filter is greater than or equal to down-sampling factors of other sub-antialias filters. Here, other sub-antialias filters may be sub-antialias filters other than the last stage sub-antialias filter of the above antialias filter.

As an example, the antialias filter may include three stages of sub-antialias filters, which are referred to as the antialias filter A, the antialias filter B, and the antialias filter C respectively. An output of the antialias filter C is the second piece of audio data. A down-sampling factor of the antialias filter C may be greater than or equal to a down-sampling factor of the antialias filter A, and may also be greater than or equal to a down-sampling factor of the antialias filter B.

As an example, the first target sampling rate may be 192 KHz. The second target sampling rate may be 16 KHz. The antialias filter may include three stages of sub-antialias filters, which are referred to as the antialias filter A, the antialias filter B, and the antialias filter C respectively. The down-sampling factor of the antialias filter A is 2, the down-sampling factor of the antialias filter B is 2, and the down-sampling factor of the antialias filter C is 3.

In some embodiments, the sub-antialias filters may be FIR filters. A down-sampling factor of the FIR filter is positively related to the number of taps of the filter. The number of taps of the FIR filter is positively related to a storage space, a computing workload, and the like. The larger the number of taps is, the larger the required storage space is and the larger the computing workload is.

It should be noted that the down-sampling factor of the last-stage sub-antialias filter being a highest down-sampling factor can minimize a sum of the number of taps of the sub-antialias filters of the antialias filter. As such, for the whole antialias filter, the minimum storage space is required and the computation when the antialias filter is used minimized. For the sub-antialias filters other than the last stage sub-antialias filter, a distance between a passband and a stopband is long, therefore the accuracy of filtering can be ensured by disposing a small number of taps. For the last-stage sub-antialias filter, a distance between the passband and the stopband is short, therefore the accuracy of filtering can be ensured only by disposing a large number of taps. The higher the down-sampling factor is, the larger the number of required taps is. A sub-antialias filter with a high down-sampling factor is arranged at the last stage, and a large number of taps can be used to ensure the accuracy of filtering of the last-stage sub-antialias filter, such that the other sub-antialias filters can be provided with a small number of taps, thereby minimizing the overall number of taps of the antialias filter.

Figure 4:
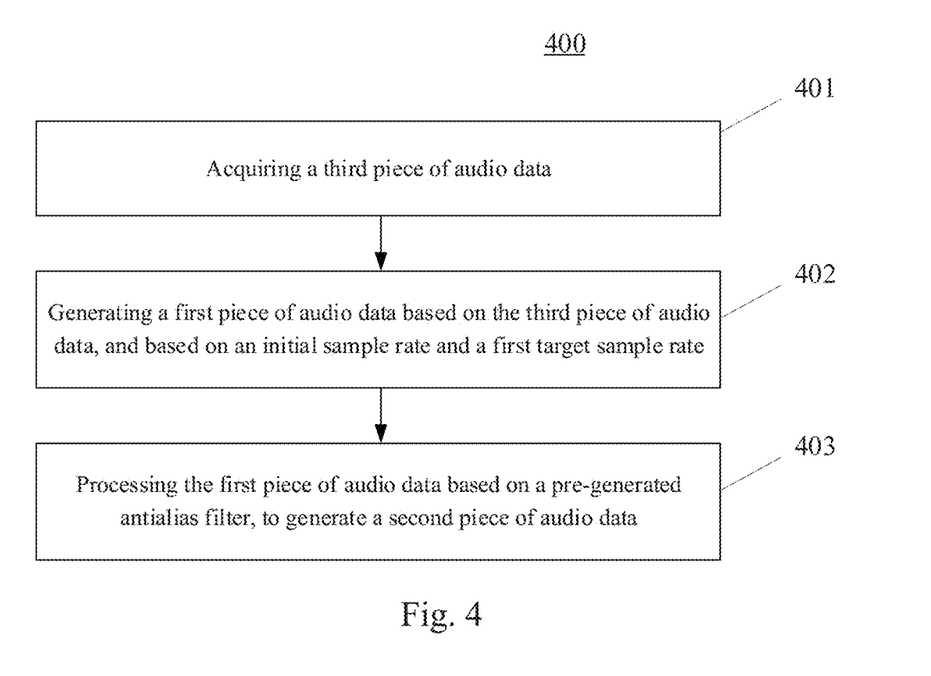
FIG. 4 is a flowchart of the method for processing audio data according to another embodiment of the present disclosure.

Further referring to FIG. 4, a process 400 of the method for processing audio data according to another embodiment is shown. The process 400 of the method for processing audio data includes the following steps 401 to 40.

Step 401 includes: acquiring a third piece of audio data.

In the present, embodiment, an executing body (e.g., the server shown in FIG. 1) of the method for processing audio data may acquire the third piece of audio data.

Here, a sampling rate of the third piece of audio data is an initial sampling rate.

It should be noted that the third piece of audio data appears after the first piece of audio data in the present disclosure, and is therefore referred to as the third piece of audio data. In practical applications, the executing body may first acquire the third piece of audio data, and then acquire the first piece of audio data.

Step 402: generating a first piece of audio data based on the third piece of audio data, and based on an initial sampling rate and a first target sampling rate.

In the present embodiment, the executing body may generate the first piece of audio data based on the third piece of audio data, and based on the initial sampling rate and the preset first target sampling rate.

Here, a sampling rate of the first piece of audio data is the first target sampling rate.

Here, if the initial sampling rate is different from the first target sampling rate, the executing body may supplement a point or discard a point on the third piece of audio data, to obtain the first piece of audio data; and if the initial sampling rate is the same as the first target sampling rate, the third piece of audio data may be used as the first piece of audio data.

Optionally, the first target sampling rate may be a sampling rate of a large value. For example, the first target sampling rate may be set as 192 KHz or 384 KHz. It can be understood that, for the third piece of audio data collected through voice, generally, the initial sampling rate is 8 KHz, 16 KHz, or 24 KHz. Therefore, generally, the first target sampling rate is greater than the initial sampling rate.

Step 403: processing the first piece of audio data based on a pre-generated antialias filter, to generate a second piece of audio data.

In the present embodiment, the executing body may process the first piece of audio data based on the pre-generated antialias filter, to generate the second piece of audio data.

Here, a sampling rate of the second piece of audio data is the second target sampling rate, and the second target sampling rate is smaller than the first target sampling rate.

The antialias filter is generated by: inputting training voice data in a training sample into an initial antialias filter; inputting an output of the initial antialias filter into a training speech recognition model, and generating a training speech recognition result; and adjusting the initial antialias filter based on the training speech recognition result and a target speech recognition result of the training voice data in the training sample, to generate the antialias filter.

The description of step 202 may be referred to for the implementation and technical details of step 403, which is not be repeatedly described here.

Figure 5:
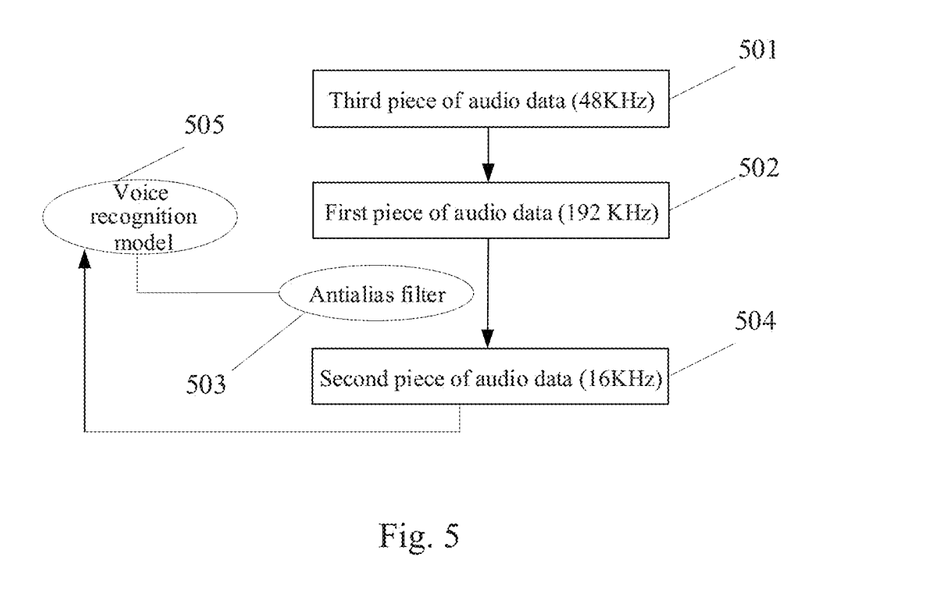
FIG. 5 is a schematic diagram of an application scenario of the method for processing audio data according to the present disclosure.

Further referring to FIG. 5, FIG. 5 shows an application scenario of the method for processing audio data according to the corresponding embodiment of FIG. 4.

First, the server may acquire a third piece of audio data 501. As an example, a sampling rate of the third piece of audio data is 48 KHz.

Then, the first piece of audio data 502 generated based on the third piece of audio data, and based on the initial sampling rate and the preset first target sampling rate (e.g., 192 KHz). As an example, the sampling rate of the first piece of audio data is 192 KHz.

Then, the server may process the first piece of audio data based on a pre-generated antialias filter 503, to generate a second piece of audio data 504. A sampling rate of the second piece of audio data is 16 KHz. The antialias filter may be generated based on the speech recognition model 505.

Finally, the second piece of audio data may be inputted into a speech recognition model, to generate a speech recognition result.

The method illustrated in the present embodiment acquires a third piece of audio data, where a sampling rate of the third piece of audio data is an initial sampling rate; then generates a first piece of audio data based on the third piece of audio data, and based on the initial sampling rate and a preset first target sampling rate, a sampling rate of the first piece of audio data being the first target sampling rate; and processes the first piece of audio data based on a pre-generated antialias filter, to generate a second piece of audio. The technical effects may include:

First, a novel approach of processing audio data is provided. Specifically, a novel approach of converting the sampling rate of the audio data is provided.

Second, a ratio between the first target sampling rate and the second target sampling rate may be pre-known. As such, for different initial sampling rates, an antialias filter may be preset, to achieve down-sampling from the first target sampling rate to the second target sampling rate.

In some embodiments, the method may further include: generating the third piece of audio data in a target transmission format based on a received fourth piece of audio data.

It should be noted that the executing body may first acquire the fourth piece of audio data, and then generate the third piece of audio data.

Here, a transmission format of the fourth piece of audio data is in a preset transmission format set.

It can be understood that there are various transmission standards for audio data, e.g., Pulse Density Modulation (PDM), Pulse Code Modulation (PCM), Integrated Interchip Sound (IIS), and Time Division Multiplexing (TDM).

Here, audio data complying with a transmission standard may be referred to as audio data in a format of this transmission standard. As an example, audio data complying with the PCM standard can be referred to as audio data in the PCM format.

Here, the executing body may receive the fourth piece of audio data in various transmission formats from other electronic devices. If the original transmission format of the received fourth piece of audio data is different from the above target transmission format, the fourth piece of audio data may be processed, to convert the fourth piece of audio data into the target transmission format; and then the processed audio data in the target transmission format is determined for use as the third piece of audio data. If the original transmission format of the received fourth piece of audio data is the same as the above target transmission format, the received fourth piece of audio data may be used as the third piece of audio data. Here, for a transmission format in the preset transmission format set, a method for converting from the transmission format to the target transmission format may be set.

It should be noted that converting the fourth piece of audio data in any transmission format into the third piece of audio data in the target transmission format can provide a basis for sampling rate conversion, thereby realizing sampling rate conversion processing on audio data in any transmission format.

It should be noted that the fourth pieces of audio data in different transmission formats generally has different noise characteristics. For example, audio data in a PDM format generally has large DC noise and background noise; and audio data in an IIS format generally has a low noise. The third piece of audio data corresponding to the fourth piece of audio data generally has the same noise characteristics as the fourth piece of audio data; and noise characteristics of the first piece of audio data are the same as the noise characteristics of the corresponding third piece of audio data. In the existing technology, for audio data pieces with different noise characteristics, different filters generally need to be established.

It should be noted that, in the present disclosure, generating the antialias filter based on the speech recognition model may include establishing an antialias filter adapted for various noise characteristics under the guidance of the speech recognition result, whilst ensuring the filtering performance of the antialias filter. Therefore, the fourth piece of audio data in various transmission formats can be processed based on the same antialias filter, to generate the second piece of audio data at the second target sampling rate. Therefore, the number of established antialias filters can be reduced, thereby reducing the space for storing (parameters of) the antialias filters. If the antialias filter is implemented by hardware, the hardware overhead can be greatly reduced.

It can be understood that converting the transmission format of audio data does not affect the sampling rate of the audio data. A sampling rate of the fourth piece of audio data is the same as that of the third piece of audio data, which is the initial sampling rate.

As an example, the preset transmission format set may include, but is not limited to, at least one of the following items: a PDM format, a TDM format, and an IIS format. The transmission format of the fourth piece of audio data may include, but is not limited to, at least one of the following items: the PDM format, the TDM format, and the IIS format.

In some embodiments, the target transmission format is a pulse code modulation format.

In some embodiments, the above step 401 may include: inputting, in response to receiving the fourth piece of audio data in a pulse density modulation format, the fourth piece of audio data into a cascaded integrator comb filter, to generate the third piece of audio data in the pulse code modulation format.

Here, the cascaded integrator comb (CIC) filter is a kind of FIR filter.

Here, the FIR filter, also known as a non-recursive filter, is a basic element in a digital signal processing system, and can have strict linear phase-frequency characteristics whilst guaranteeing any amplitude-frequency characteristics.

It should be noted that the CIC filter has the characteristics of a low-pass filter, while other FIR filters can present various characteristics, such as low-pass, high-pass, and band-pass. Unlike most FIRs, the implementation of the CIC only requires use of addition and subtraction. Therefore, compared with other FIR filters, a PDM signal is processed using the CIC filter, which can reduce the computation and hardware overhead for generating the third piece of audio data.

In some embodiments, the above step 401 may include: performing, in response to receiving the fourth piece of audio data in a time division multiplexing format, serial-to-parallel conversion on the fourth piece of audio data, to generate the third piece of audio data in the pulse code modulation format.

Here, for the fourth piece of audio data in the time division multiplexing format, the present disclosure provides a processing mode of serial-to-parallel conversion. Therefore, the fourth piece of audio data can be converted into the third piece of audio data in the target transmission format, such that subsequent sampling rate conversion processing can be performed.

In some embodiments, a training sample of the antialias filter may include training voice data in at least two transmission formats.

Optionally, the initial training samples in various transmission formats at various sampling rates can be inputted into a pre-established pre-processing model, to generate the training voice data at the first target sampling rate.

Here, the pre-processing model may first convert the initial training samples into the training voice data in the target transmission format, and then convert the training voice data (initial sampling rate) in the target transmission format into the training voice data at the first target sampling rate.

Here, the training voice data at the first target sampling rate is in the target transmission format.

It should be noted that the training voice data in the at least two transmission formats may be used, such that the antialias filter obtained by training can accurately process the audio data in the at least two transmission formats, to ensure the accuracy of a processing result.

It should be noted that the initial training samples including at least two transmission formats are pre-processed, to generate the training voice data at the first target sampling rate; the training voice data at the first target sampling rate are processed by an initial antialias filter, to generate the training voice data at the second target sampling rate; and the training voice data at the second target sampling rate are used for generating a training speech recognition result by a training speech recognition model. As such, the audio data processing flow is consistent in the initial antialias filter training stage and in the antialias filter use stage. The antialias filter thus generated can be guaranteed to have high accuracy and reliability when in use.

In some embodiments, the above step 402 may include: processing the third piece of audio data using an asynchronous sample rate convertor, to generate the first piece of audio data.

Here, the asynchronous sample rate convertor (ASRC) can be used to realize eliminating a difference between the initial sampling rate and the first target sampling rate. If the initial sampling rate and the first target sampling rate are sampling rates in different clock sources, the ASRC can eliminate sampling rate errors caused by different clock sources.

For example, if the initial sampling rate is a sampling rate determined by a clock source of an audio collecting device, and the first target sampling rate is a sampling rate (48.0 KHz) determined by a clock source of the executing body; then a nominal initial sampling rate may be 48.0 KHz. However, the initial sampling rate determined by the clock source of the executing body may be 48.1 KHz. In this case, with the ASRC, 48.1 KHz can be corrected to 48.0 KHz determined by the clock source of the executing body.

Here, a device implementing the ASRC may be referred to as the asynchronous sampling rate convertor.

Figure 6:
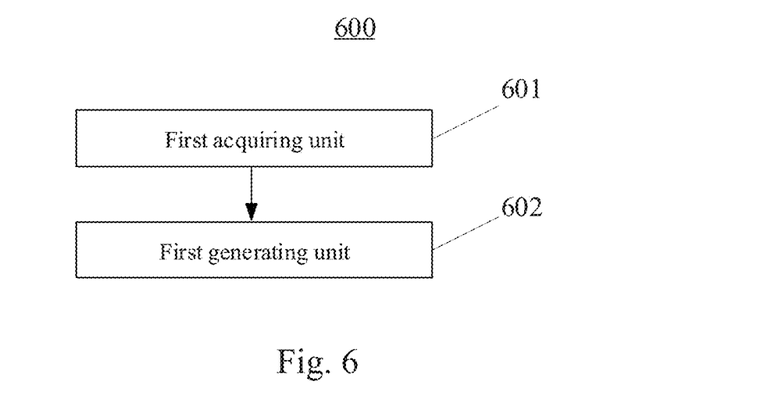
FIG. 6 is a schematic structural diagram of an apparatus for processing audio data according to an embodiment of the present disclosure.

Further referring to FIG. 6, as an implementation of the method shown in the above figures, an embodiment of the present disclosure provides an apparatus for processing audio data. The embodiment of the apparatus corresponds to the embodiment of the method shown in FIG. 2. Besides the features disclosed below, the embodiment of the apparatus may further include features identical to or corresponding to the embodiment of the method shown in FIG. 2. The apparatus may be specifically applied to various electronic devices.

As shown in FIG. 6, the apparatus 600 for processing audio data of the present embodiment includes: a first acquiring unit 601 and a first generating unit 602. The first acquiring unit 601 is configured to acquire a first piece of audio data, a sampling rate of the first piece of audio data being a first target sampling rate; and the first generating unit 602 is configured to process the first piece of audio data based on a pre-generated antialias filter, to generate a second piece of audio data, a sampling rate of the second piece of audio data being a second target sampling rate, and the second target sampling rate being smaller than the first target sampling rate; where the antialias filter is generated by: inputting training voice data in a training sample into an initial antialias filter; inputting an output of the initial antialias filter into a training speech recognition model, and generating a training speech recognition result; and adjusting the initial antialias filter based on the training speech recognition result and a target speech recognition result of the training voice data in the training sample, to generate the antialias filter.

The related description of step 201 and step 202 in the corresponding embodiment of FIG. 2 may be referred to for specific processing of the first acquiring unit 601 and the first generating unit 602 of the apparatus for processing audio data in the present embodiment and the technical effects thereof, respectively, which is not repeatedly described here.

In some embodiments, the recognition accuracy rate of the training speech recognition model is greater than the preset accuracy rate threshold.

In some other embodiments, the antialias filter includes at least two stages of sub-antialias filters, the sub-antialias filters of the antialias filter are connected sequentially, and the sub-antialias filters are finite impulse response filters; and the first generating unit is further configured to: perform low-pass filtering and down-sampling on the first piece of audio data using the sub-antialias filters, to generate the second piece of audio data, where a down-sampling factor corresponding to each sub-antialias filter is preset, and a down-sampling factor of a last stage sub-antialias filter is greater than or equal to down-sampling factors of other sub-antialias filters.

In some embodiments, the apparatus further includes: a second acquiring unit (not shown) configured to: acquire a third piece of audio data, where a sampling rate of the third piece of audio data is an initial sampling rate; and a second generating unit (not shown) configured to generate the first piece of audio data based on the third piece of audio data, and based on the initial sampling rate and the first target sampling rate.

In some embodiments, the apparatus further includes: a third generating unit configured to generate the third piece of audio data in a target transmission format based on a received fourth piece of audio data, where a transmission format of the fourth piece of audio data is in a preset transmission format set.

In some embodiments, the target transmission format is a pulse code modulation format; and the third generating unit is further configured to: input, in response to receiving the fourth piece of audio data in a pulse density modulation format, the fourth piece of audio data into a cascaded integrator comb filter, to generate the third piece of audio data in the pulse code modulation format.

In some embodiments, the second generating unit is configured to: process the third piece of audio data by an asynchronous sampling rate convertor, to generate the first piece of audio data.

Figure 7:
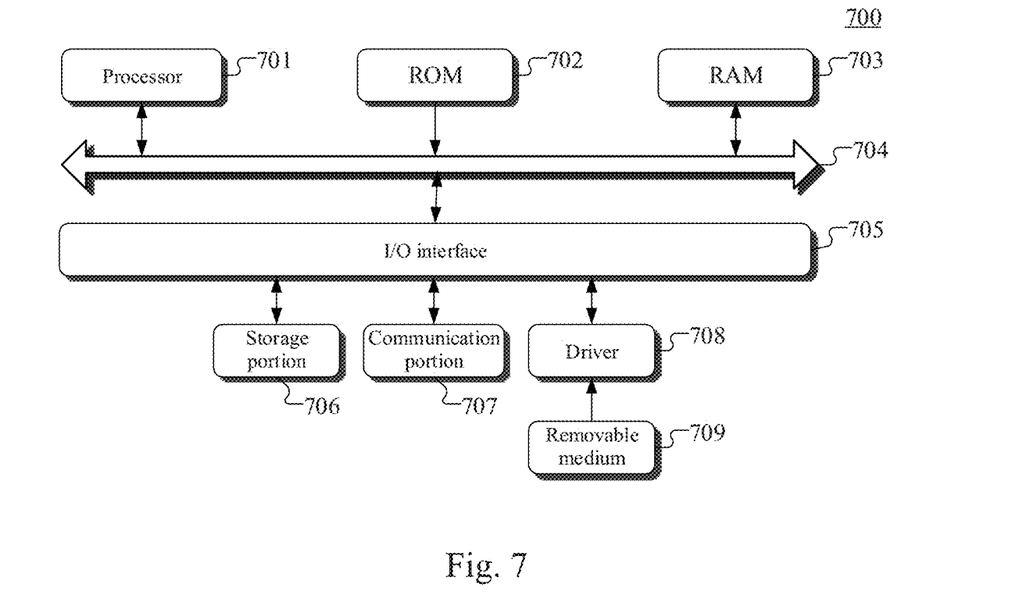
FIG. 7 is a schematic structural diagram of a computer system adapted to implement an electronic device of embodiments of the present disclosure.

Referring to FIG. 7 below, a schematic structural diagram of a computer system 700 adapted to implement an electronic device of embodiments of the present disclosure is shown. The electronic device shown in FIG. 7 is merely an example, and should not pose any limitation on the functions and scope of use of the embodiments of the present disclosure.

As shown in FIG. 7, the computer system 700 includes a processor (e.g., a central processing unit (CPU) 701, which may execute various appropriate actions and processes in accordance with a program stored in a read only memory (ROM) 702 or a program loaded into a random access memory (RAM) 703 from a storage portion 706. The RAM 703 further stores various programs and data required by operations of the system 700. The CPU 701, the ROM 702, and the RAM 703 are connected to each other through a bus 704. An input/output (I/O) interface 705 is also connected to the bus 704.

The following components are connected to the I/O interface 705: a storage portion 706 including a hard disk, or the like; and a communication portion 707 including a network interface card, such as a LAN (local area network) card, and a modem. The communication portion 707 performs communication processing via a network, such as the Internet. A driver 708 is also connected to the I/O interface 705 as needed. A removable medium 709, such as a magnetic disk, an optical disk, a magneto-optical disk, and a semiconductor memory, may be installed on the driver 708 as needed, such that a computer program read therefrom is installed in the storage portion 706 as needed.

In particular, according to an embodiment of the present disclosure, the process described above with reference to the flowchart may be implemented as a computer software program. For example, the embodiment of the present disclosure includes a computer program product, which includes a computer program stored on a computer-readable medium, and the computer program includes program code for executing the method shown in the flowchart. In the embodiment, the computer program can be downloaded and installed from the network through the communication portion 707, and/or installed from the removable medium 709. When the computer program is executed by the processor 701, the above functions defined in the method of the present application are executed. It should be noted that the computer-readable medium of the present application may be a computer-readable signal medium, a computer-readable storage medium or any combination of the two. A computer-readable storage medium may be, for example, but is not limited to, a system, device or component of electricity, magnetism, or, electromagnetism, infrared, or semiconductor, or any combination of the above. More specific examples of a computer-readable storage medium may include, but are not limited to, an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the above. In the present disclosure, the computer-readable storage medium may be any tangible medium containing or storing a program which may be used by or in combination with an instruction execution system, device or component. In the present disclosure, the computer-readable signal medium may include a data signal propagated in the baseband or as a part of the carrier where the computer-readable program code is carried. The transmitted data signal can take various forms, including but not limited to electromagnetic signal, optical signal or any suitable combination of the above. The computer-readable signal medium may also be any computer-readable medium other than the computer-readable storage medium, which may transmit, propagate or transmit programs for use by or in combination with an instruction execution system, device or component. The program code contained in the computer-readable medium can be transmitted with any suitable medium, including but not limited to: wireless, electric wire, optical cable, RF, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including a first acquiring unit and a first generating unit. The names of the units do not constitute a limitation to such units themselves in some cases. For example, the first acquiring unit may alternatively be described as "a unit configured to acquire audio data."

In another aspect, an embodiment of the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire a first piece of audio data, a sampling rate of the first piece of audio data being a first target sampling rate; and process the first piece of audio data based on a pre-generated antialias filter, to generate a second piece of audio data, a sampling rate of the second piece of audio data being a second target sampling rate, and the second target sampling rate being smaller than the first target sampling rate; where the antialias filter is generated by: inputting training voice data in a training sample into an initial antialias filter; inputting an output of the initial antialias filter into a training speech recognition model, and generating a training speech recognition result; and adjusting the initial antialias filter based on the training speech recognition result and a target speech recognition result of the training voice data in the training sample, to generate the antialias filter.

The above description is only an illustration of preferred embodiments of the disclosure and the applied technical principles. It should be understood by those skilled in the art that the scope of the invention in the present disclosure is not limited to the technical solution formed by the specific combination of the above technical features, but also includes other technical solutions formed by any combination of the above technical features or their equivalent features without departing from the above invention concept, for example, a technical solution formed by mutually replacing above technical features with other features having similar functions disclosed (but not limited to) in the disclosure.

What is claimed is:

1. A method for processing audio data, comprising:
   acquiring a first piece of audio data, a sampling rate of the first piece of audio data being a first target sampling rate; and
   processing the first piece of audio data based on a pre-generated antialias filter, to generate a second piece of audio data, a sampling rate of the second piece of audio data being a second target sampling rate, and the second target sampling rate being smaller than the first target sampling rate; wherein
   the antialias filter is generated by:
   inputting training voice data in a training sample into an initial antialias filter;
   inputting an output of the initial antialias filter into a training speech recognition model, and generating a training speech recognition result; and
   adjusting the initial antialias filter based on the training speech recognition result and a target speech recognition result of the training voice data in the training sample, to generate the antialias filter.

2. The method according to claim 1, wherein a recognition accuracy rate of the training speech recognition model is greater than a preset accuracy rate threshold.

3. The method according to claim 1, wherein the antialias filter comprises at least two stages of sub-antialias filters, the sub-antialias filters of the antialias filter are connected sequentially, and the sub-antialias filters are finite impulse response filters; and
   the processing the first piece of audio data based on a pre-generated antialias filter, to generate a second piece of audio data comprises:
   performing low-pass filtering and down-sampling on the first piece of audio data using the sub-antialias filters, to generate the second piece of audio data, wherein down-sampling factors corresponding to the sub-antialias filters are preset, and a down-sampling factor of a last-stage sub-antialias filter is greater than or equal to down-sampling factors of other sub-antialias filters.

4. The method according to claim 1, wherein the method further comprises:
   acquiring a third piece of audio data, wherein a sampling rate of the third piece of audio data is the initial sampling rate; and
   generating the first piece of audio data based on the third piece of audio data, and based on the initial sampling rate and the first target sampling rate.

5. The method according to claim 4, wherein before the acquiring a third piece of audio data, the method further comprises:
   generating the third piece of audio data in a target transmission format based on a received fourth piece of audio data, wherein a transmission format of the fourth piece of audio data is in a preset transmission format set.

6. The method according to claim 5, wherein the target transmission format is a pulse code modulation format; and
   the generating the third piece of audio data in a target transmission format based on a received fourth piece of audio data comprises:
   inputting, in response to receiving the fourth piece of audio data in a pulse density modulation format, the fourth piece of audio data into a cascaded integrator comb filter, to generate the third piece of audio data in the pulse code modulation format.

7. The method according to claim 4, wherein the generating the first piece of audio data based on the third piece of audio data, and based on the initial sampling rate and the first target sampling rate comprises:
   processing the third piece of audio data by an asynchronous sampling rate convertor, to generate the first piece of audio data.

8. An apparatus for processing audio data, comprising:
   at least one processor; and
   a memory storing instructions, wherein the instructions when executed by the at least one processor, cause the at least one processor to perform operations, the operations comprising:
   acquiring a first piece of audio data, a sampling rate of the first piece of audio data being a first target sampling rate; and
   processing the first piece of audio data based on a pre-generated antialias filter, to generate a second piece of audio data, a sampling rate of the second piece of audio data being a second target sampling rate, and the second target sampling rate being smaller than the first target sampling rate; wherein
   the antialias filter s generated by:
   inputting training voice data in a training sample into an initial antialias filter;
   inputting an output of the initial antialias filter into a training speech recognition model, and generating a training speech recognition result; and
   adjusting the initial antialias filter based on the training speech recognition result and a target speech recognition result of the training voice data in the training sample, to generate the antialias filter.

9. A non-transitory computer readable medium, storing a computer program, wherein the program, when executed by a processor, causes the processor to perform operations, the operations comprising:
   acquiring a first piece of audio data, a sampling rate of the first piece of audio data being a first target sampling rate; and
   processing the first piece of audio data based on a pre-generated antialias filter, to generate a second piece of audio data, a sampling rate of the second piece of audio data being a second target sampling rate, and the second target sampling rate being smaller than the first target sampling rate; wherein the antialias filter is generated by:

inputting training voice data is a training sample into an initial antialias filter;

inputting an output of the initial antialias filter into a training speech recognition model, and generating a training speech recognition result; and adjusting the initial antialias filter based on the training speech recognition result and a target speech recognition result of the training voice data in the training sample, to generate the antialias filter.

* * * * *

UNITED STATES PATENT AND TRADEMARK OFFICE
CERTIFICATE OF CORRECTION

| | |
|---|---|
| PATENT NO. | : 11,211,051 B2 |
| APPLICATION NO. | : 16/805053 |
| DATED | : December 28, 2021 |
| INVENTOR(S) | : Chao Tian |

It is certified that error appears in the above-identified patent and that said Letters Patent is hereby corrected as shown below:

In the Claims

Column 17, Line 6 (Claim 9, Line 15), please delete "inputting training voice data is" and insert --inputting training voice data in-- therefor.

Signed and Sealed this
Twenty-fourth Day of May, 2022

Katherine Kelly Vidal
*Director of the United States Patent and Trademark Office*